G. H. RIDLON.
NUT TAPPING MACHINE.
APPLICATION FILED AUG. 30, 1911.
1,043,462.
Patented Nov. 5, 1912.
3 SHEETS—SHEET 1.
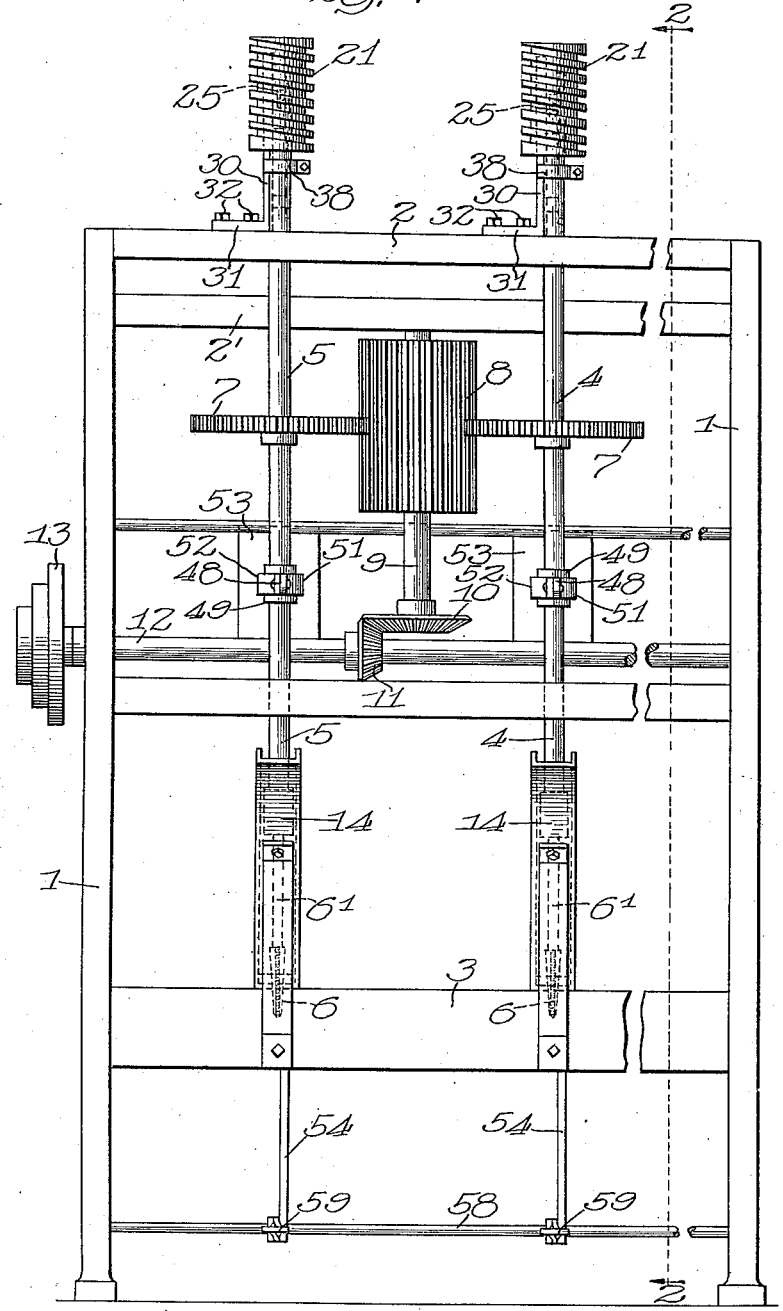

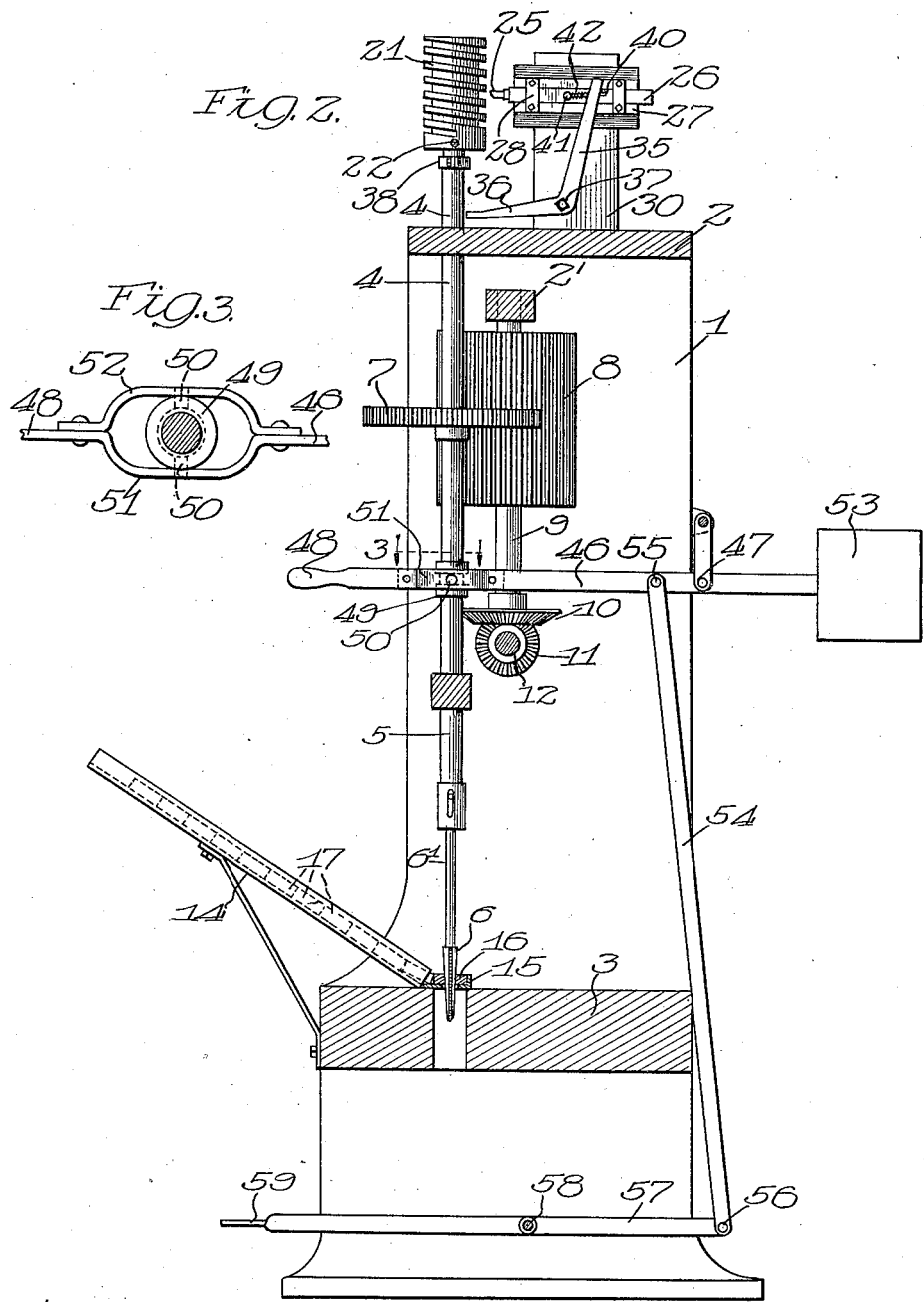

G. H. RIDLON.
NUT TAPPING MACHINE.
APPLICATION FILED AUG. 30, 1911.
1,043,462.
Patented Nov. 5, 1912.
3 SHEETS—SHEET 3.
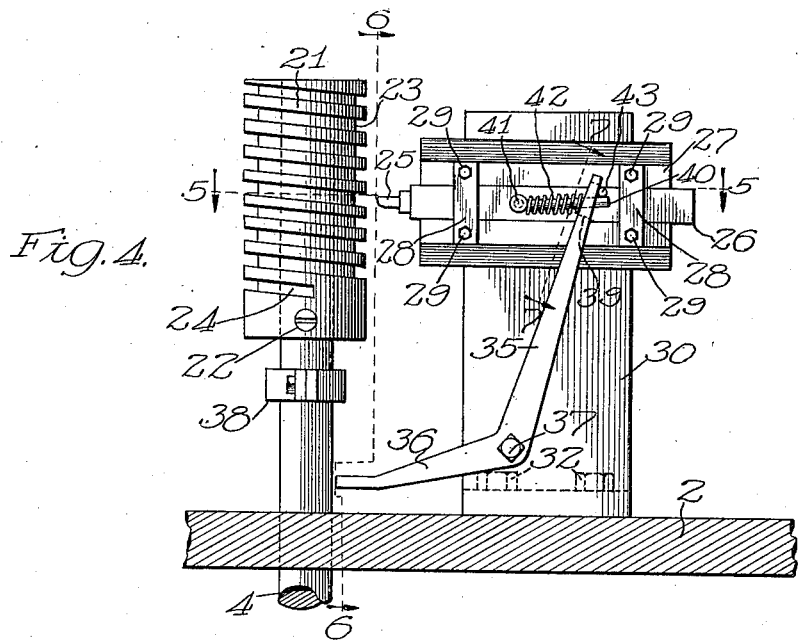
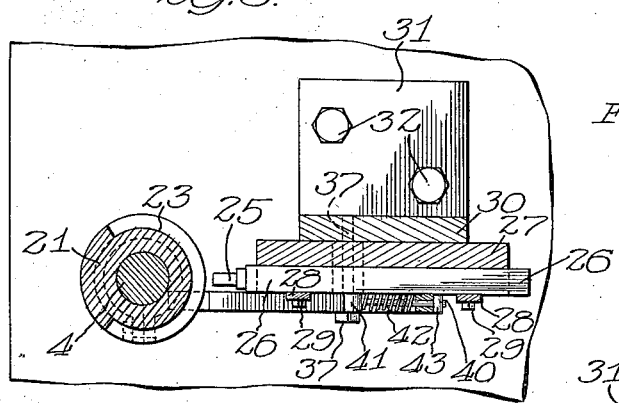
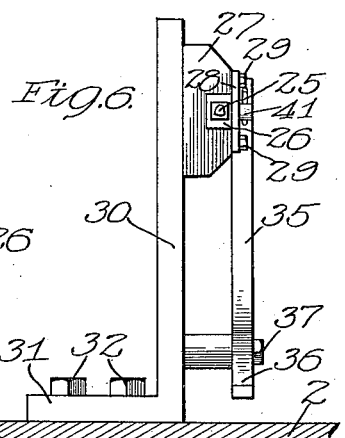
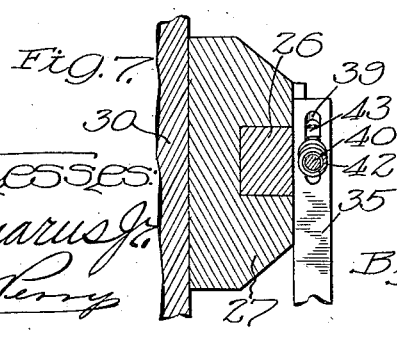

UNITED STATES PATENT OFFICE.

GEORGE H. RIDLON, OF SOUTH WHITLEY, INDIANA, ASSIGNOR TO ACME MACHINERY COMPANY, OF CLEVELAND, OHIO, A CORPORATION OF OHIO.

NUT-TAPPING MACHINE.

1,043,462.     Specification of Letters Patent.     Patented Nov. 5, 1912.

Application filed August 30, 1911.  Serial No. 646,895.

*To all whom it may concern:*

Be it known that I, GEORGE H. RIDLON, a citizen of the United States, residing at South Whitley, in the county of Whitley and State of Indiana, have invented certain new and useful Improvements in Nut-Tapping Machines, of which the following is a description.

My invention belongs to that general class of devices known as nut tapping machines, and particularly that class in which the nuts are fed under the tapping spindle and tapped one or more at a time, and the spindle then withdrawn or raised to permit the feeding or positioning of additional nuts, the machine operating automatically on the succeeding nuts.

My invention has among its objects the production of a device that is simple, convenient, durable, efficient, rapid and reliable and which may be used wherever found applicable.

To this end my invention consists in the novel construction, arrangement, and combination of parts herein shown and described, and more particularly pointed out in the claims.

In the drawings, wherein like reference characters indicate like or corresponding parts; Figure 1 is a front elevation of a two spindle tapping machine. Fig. 2 is a sectional view of the same taken substantially on line 2—2 of Fig. 1. Fig. 3 is a detail sectional view taken substantially on line 3—3 of Fig. 2. Fig. 4 is a side elevation of the preferred mechanism for automatically controlling the raising or lifting of the tapping spindle. Fig. 5 is a sectional view of the same taken substantially on line 5—5 of Fig. 4. Fig. 6 is a sectional view taken substantially on line 6—6 of Fig. 5, and Fig. 7 is an enlarged sectional view taken substantially on line 7—7 of Fig. 4.

Referring to the drawings in which my preferred form of machine is shown, 1—1 represents the sides of the machine frame, 2 the top, and 3 a bar or brace across the bottom, it being understood that the frame of the machine may be constructed of any suitable material and of any desired form or design. The tapping spindles 4 and 5, a two spindle machine being shown, are provided with the taps 6 on shanks 6', the shanks being secured on the spindles. The two tapping spindles 4 and 5 are longitudinally or vertically movable as well as rotatable and may be driven in any desired way, as shown they are provided with spur-wheels or gears 7 which mesh with the gear 8 driven by a shaft 9. The shaft 9 is provided with a bevel gear 10 meshing with the bevel gear 11 and driven by the shaft 12, which may be driven by the pulley 13 or in any equivalent manner. The gear 8 being of a considerable length the gear wheels 7 always mesh therewith and are driven at any point in their vertical travel so that the spindles continually rotate during raising or lowering.

The nuts to be tapped may be fed to the machine and be supported in any suitable way while being tapped, a simple construction is shown in which 14 is a slide arranged to receive any desired number of nuts 17, 16 being a nut immediately under the spindle in position to be tapped, a stop 15 preventing the movement or rotation of the nut. The stop 15 being arranged on the frame bar 3 affords a firm support for the nut while being tapped.

The present invention consists particularly in means for lifting the spindles automatically whenever a nut has been tapped, so that the new nut may be positioned under the tap, and it includes simple means for raising the spindles by hand or by foot pedal.

Referring particularly to Figs. 2 and 4, the spindle 4 (the other spindle being similarly arranged) is provided at its upper end with a threaded member 21 having a thread 23 therein, the thread being preferably brought to the surface as at 24 at the lower end of the member. The member 21 may be secured upon the spindle in any desired way, a screw 22 being found very convenient for that purpose. Suitably supported proximate the member 21 and arranged to engage the thread or disengage therefrom, as desired, is a tooth 25, preferably hardened so as to withstand wear. The tooth 25 is carried by a longitudinally movable bar 26, slidably mounted in a plate 27, straps 28 and bolts 29 affording a convenient means for securing the bar in position. The plate 27 is mounted upon a bracket or support 30, which may be formed in any suitable manner, depending upon the machine upon which the device is to be used. Where used on a machine provided with a flat top similar to top 2 shown, the bracket 30 may be extended as at 31, and secured to the frame of the machine by bolts 32 or their equivalents for the purpose. The bar 26 and tooth 25 are moved longitudinally by a bell crank lever 35—36 pivotally secured to the support 30 by a bolt 37. Upon the spindle 4 is arranged a collar 38, the end 36 of the crank being extended under the collar 38, so that the bell crank will be operated when the spindle lowers sufficiently to bring the collar into engagement with the end of the arm. The opposite end of the arm 35 of the crank is suitably connected to the bar 26 preferably by means of a resilient member 42.

Referring particularly to Figs. 4, 5 and 7, 40 is a small rod pivotally secured to the bar 26 at 41, which rod 40 extends through an opening 39 in the end of the arm 35. Between the end or the pin 41 and the arm 35 is arranged a spring 42 or its equivalent, 43 being a stop for rod 40 and arm 35. It is, of course, understood that any equivalent resilient connection may be employed between the arm and the bar 26, that shown, however, being the preferred construction.

The construction just described comprises the automatically operable lifting device. To lift the spindle manually or by hand, the lever 46 may be provided, which lever is pivotally supported at 47 and extended as at 48 to form a handle. The rod or handlever 46 is provided with an off-set portion 51 and part 52 which embrace a grooved collar 49 secured on the spindle, pins 50 engaging the groove in the collar. If desired, a counterweight 53 may be secured upon the extended end of the lever 46. If it is desired to provide means for lifting the spindle by the foot of the operator, a pedal 59 may be provided, which may be pivotally supported at 58 and extended as at 57. At the extended end 57 is secured a connecting bar 54, the bar 54 being connected to the lever 46 and the pedal lever 57 by pins 55 or their equivalents.

The operation of the device may be briefly described as follows: The spindle 4 is driven from the shaft 12 through the bevel gears 11 and 12, shaft 9 and gears 8 and 7 rotating the shaft in the desired direction. The slide 14 is filled with the desired number of nuts 17. As the spindle is raised, one of the nuts, as shown, 16 will slide under the tap 6. If the rotating spindle is then released, it will drop and the tap 6 will engage and tap the nut. As soon as the tap has passed through the nut, the spindle will drop from gravity so that the collar 38 will engage the arm 36 which will throw the arm 35 toward the spindle, thereby longitudinally moving the bar 26 and forcing the tooth 25 into engagement at the thread 23 near the top of the threaded member 21. As the spindle continues to rotate, the threaded member 21 is driven or rotated and the tooth 25 being in engagement and stationary relative the longitudinal travel of the spindle, the spindle is raised or lifted until the tooth 25 is forced out of the thread at the point where the thread comes to the surface, that is, at 24. The tapped nut will rise or ride up on the tap shank 6' and the spindle being up, a new nut will drop or slide upon the support 15. As soon as the tooth 25 is thrown out of engagement, the nut having already been positioned the spindle will drop and tap the new nut, and as soon as the nut is tapped, will drop farther and be automatically raised, as heretofore set forth.

It will be particularly noted that with this construction, the automatic mechanism for raising the spindle may be applied to any type machine, provided with any number of longitudinally movable and continuously rotatable spindles inasmuch as the parts are detachable so that the threaded part may be provided upon any spindle, and the bracket 30 may be formed to be positioned on any type of machine frame.

Having thus described my invention, it is obvious that various immaterial modifications may be made in the same without departing from the spirit of my invention, hence I do not wish to be understood as limiting myself to the exact construction, arrangement, combination of parts or uses shown, described or mentioned.

What I claim as new, and desire to secure by Letters Patent is—

1. In a nut tapping machine and in combination, a rotatable spindle and means for lifting said spindle comprising a threaded member at its upper end having a single thread, a movable engaging member therefor, and means for forcing said member into engagement with said threaded member.

2. In a tapping machine and in combination, a rotatable spindle and means for lifting said spindle comprising a single threaded screw mounted on said spindle, a movable engaging tooth for said screw, and means for moving said tooth into engagement with said screw when the spindle reaches the end of its travel in one direction.

3. In a nut tapping machine and in combination, a rotatable spindle and means for lifting said spindle comprising a single threaded screw mounted on said spindle, a movable engaging tooth for said screw, and means for moving said tooth into engagement with the screw after a predetermined travel of the spindle, consisting of means interposed in the path of the spindle and operatively connected with said tooth.

4. In a nut tapping machine and in combination, a rotatable spindle, a threaded member detachably mounted on said spindle, means for engaging the thread in said member at a predetermined point in the travel of said spindle, consisting of a bar movable transversely the spindle and provided with an engaging tooth thereon, and means interposed in the path of said spindle for longitudinally moving said bar and tooth, whereby said threaded member is engaged after the predetermined travel of the spindle.

5. In a device of the kind described and in combination, a frame, a longitudinally movable rotatable spindle, means for driving said spindle in the desired direction, means for automatically lifting said spindle at a predetermined point in its downward travel, comprising a detachable threaded part arranged on said spindle, a movable thread engaging member, means for supporting said thread engaging member, means operated by the spindle for operating said thread engaging member, consisting of a bell crank lever pivotally secured to said support, and means for operatively connecting said lever and the engaging member.

6. An attachment for nut tapping machines having a longitudinally movable rotatable spindle, comprising a threaded member provided with means for securing the same to the machine spindle, a toothed member for engaging said thread, a support for said toothed member, a bell crank lever pivotally secured to said support, means for resiliently connecting said toothed member and one arm of said bell crank lever, and means arranged on the spindle for engaging the other arm of said bell crank lever.

In testimony whereof, I have hereunto signed my name in the presence of two subscribing witnesses.

GEORGE H. RIDLON.

Witnesses:
 JAMES L. KIBBEE,
 CECILE G. FORD.

Copies of this patent may be obtained for five cents each, by addressing the "Commissioner of Patents, Washington, D. C."